April 17, 1956     I. L. WOODY     2,741,890
POWER LAWN MOWER
Filed Jan. 22, 1953     3 Sheets-Sheet 1
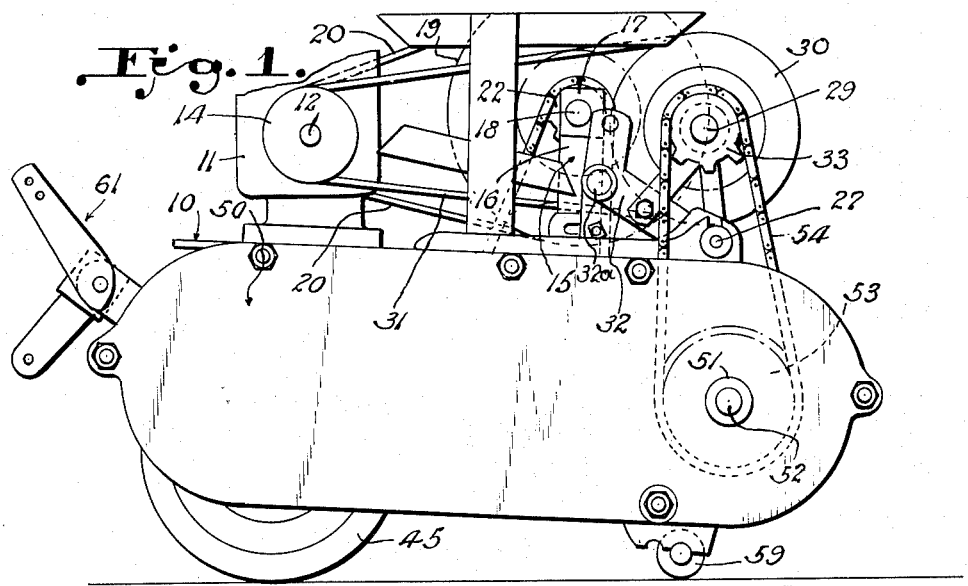
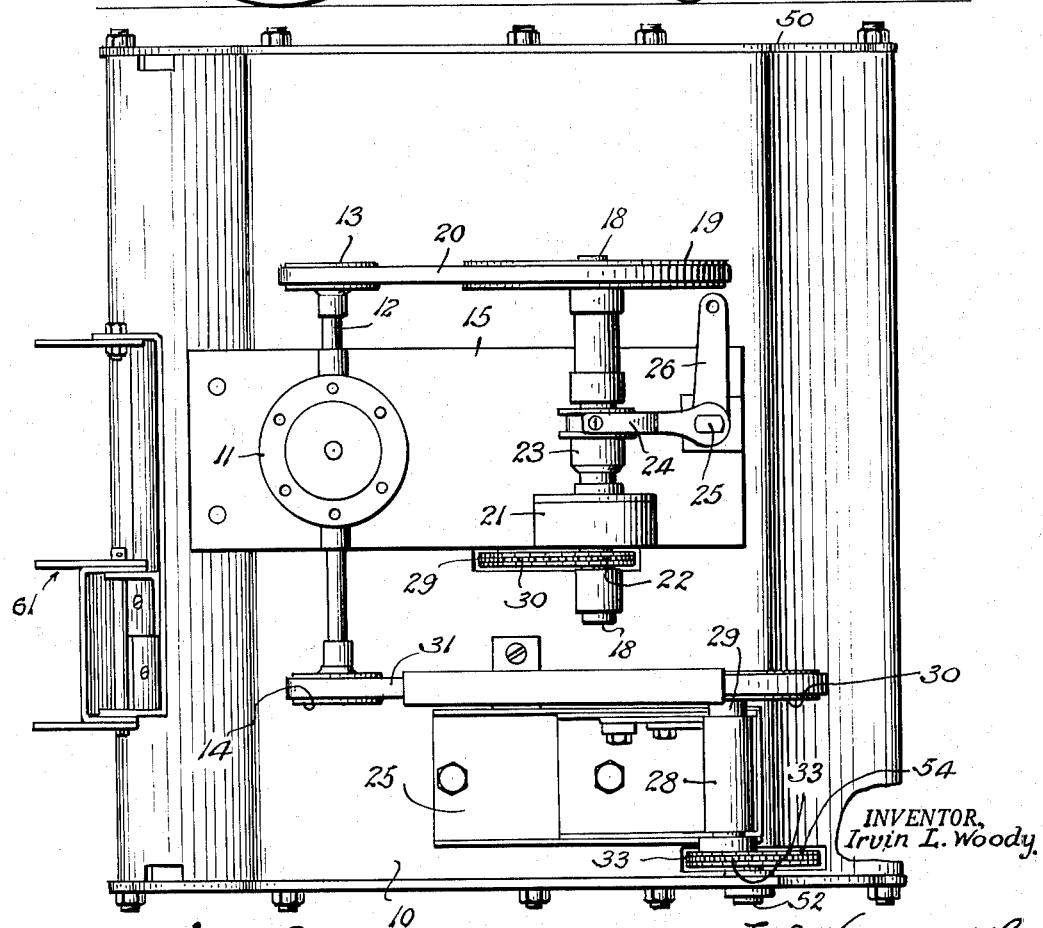
INVENTOR,
Irvin L. Woody
ATTORNEYS.

INVENTOR,
Irvin L. Woody.
BY
E. E. Vrooman & Co.,
ATTORNEYS.

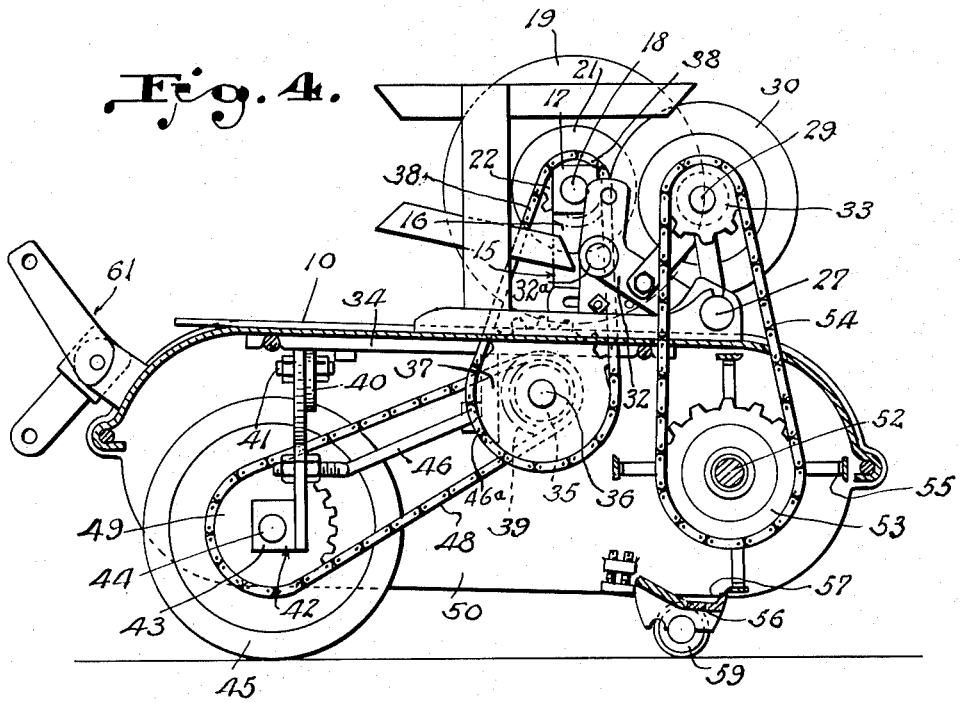
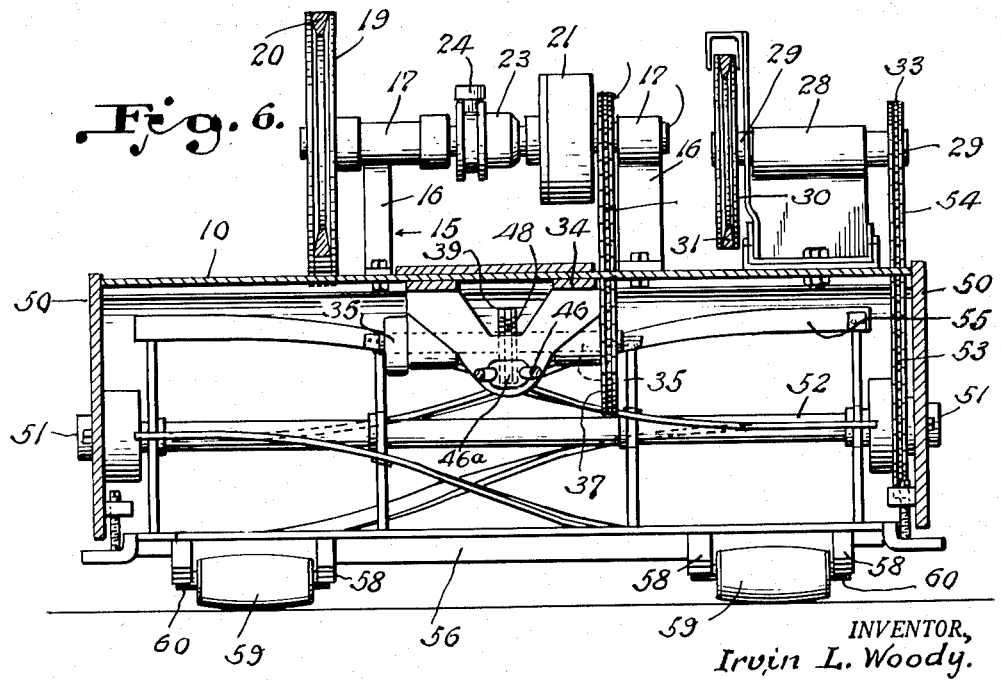

United States Patent Office 2,741,890
Patented Apr. 17, 1956

2,741,890

POWER LAWN MOWER

Irvin L. Woody, Quincy, Ill.

Application January 22, 1953, Serial No. 332,729

2 Claims. (Cl. 56—26)

This invention relates to a lawn mower and has special reference to a lawn mower having a revoluble cutter operating on a horizontal axis in connection with a fixed cutter bar.

One important object of the invention is to provide a novel device of this character of generally improved construction.

A second important object of the invention is to provide, in a lawn mower of this type, an improved cutter bar.

A third important object of the invention is to provide an improved mounting for said cutter bar.

A fourth important object of the invention is to provide improved means for adjusting the cutter bar toward and from the path of the cutting edges of the revolving cutter.

A fifth important object of the invention is to provide a cutter bar for such a lawn mower having a novel arrangement of supporting roller to ensure uniform height of cut of the grass over which the lawn mower travels.

A sixth important object of the invention is to provide supporting means for carrying the weight of the operating parts of the lawn mower.

A seventh important object of the invention is to provide novel means for driving the cutter or reel.

An eighth important object of the invention is to provide novel means for moving the lawn mower over the ground.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and:

Fig. 1 is a side elevation illustrating one embodiment of this invention.

Fig. 2 is a plan view thereof.

Fig. 4 is a view similar to Fig. 1 but with one of the side plates of the mower removed, parts thereof being shown in section.

Fig. 6 is a front view of the improved mower, certain parts thereof being shown in section.

Figure 3:
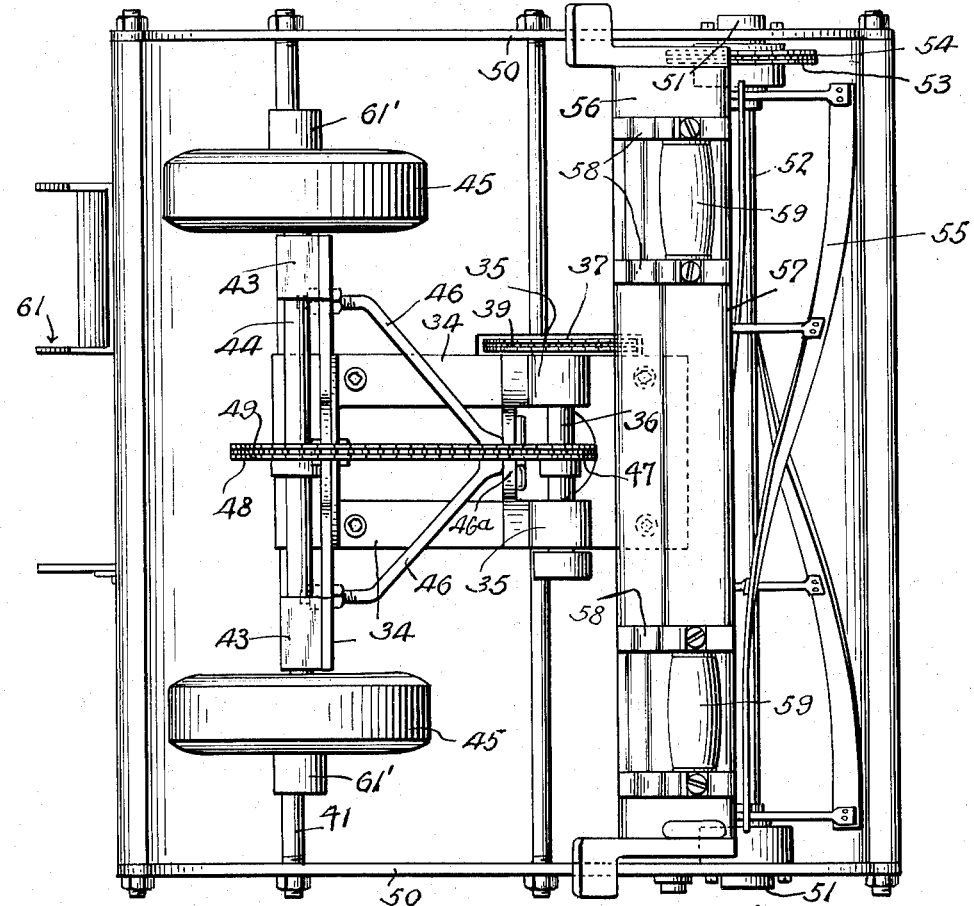
Fig. 3 is a bottom plan view of the device.
Figure 5:
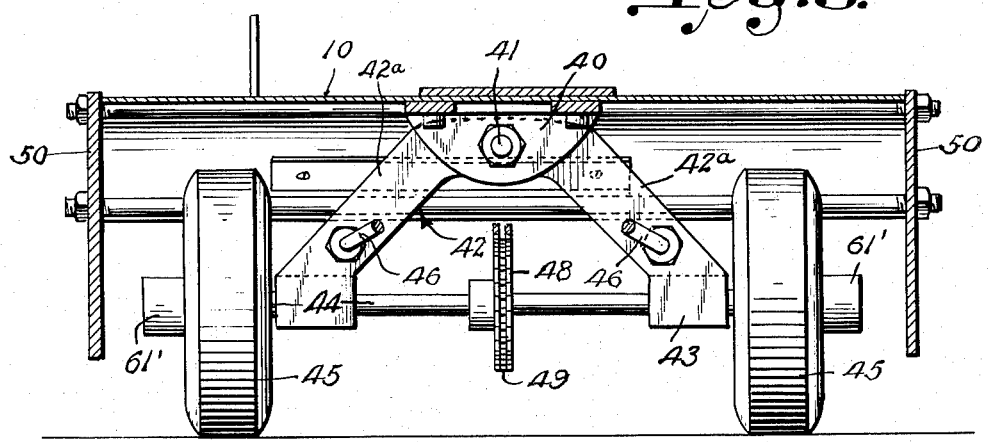
Fig. 5 is a fragmentary inverted section on the line 5—5 of Fig. 3.

In the embodiment of the invention as here shown there is provided a cover or deck 10. At the rear of this deck there is mounted a motor 11, which has a shaft 12 and on one end of this shaft there is provided a belt pulley 13, while on the other end of the shaft there is provided a belt pulley 14. Mounted forwardly of the motor on the deck is a frame 15, which extends laterally of the deck and has at each end an upright 16, on which is carried a bearing 17. Journalled in the bearings is a jack shaft 18 and fixed on the left hand end of this shaft is a belt pulley 19, which is connected to the pulley 13 by a belt 20. Revoluble on the shaft 18 is a clutch member 21, carrying a sprocket 22. There is also mounted on the shaft 18 a clutch member 23 splined to move longitudinally and movable by means of a shipper member 24, which is rockingly mounted on a shaft 25 and actuated by a lever arm 26 adapted to be connected to the handle of the mower by means not deemed necessary here to be shown. Rockingly mounted on a transverse shaft 27 is a bearing sleeve 28 having a second jack shaft 29 journalled therein. At one end of this shaft there is fixed a belt pulley 30, which is connected by a belt 31 to the motor supported belt pulley 14. The sleeve 28 is arranged to be rocked by a bell crank linkage 32 pivoted as at 32ª connected to the handle of the mower by means not deemed necessary here to be shown. When the pulley 30 is moved toward the pulley 14 the shaft 29 will not be driven but when the pulley 30 is moved away from the pulley 14, the belt will be tightened and the shaft driven. On the remaining end of the shaft 29 is a sprocket 33. Mounted on the under side of the deck is a reinforcing plate 34 and at the forward end of this reinforcing plate there is provided a pair of bearings 35 wherein is journalled a shaft 36. On the shaft 36 is fixed a sprocket 37, which is connected by a chain 38 with the sprocket 22. Also on this shaft 36 is a driving sprocket 39 securely keyed to the shaft. At the rear end of the plate 34 is a bearing 40 supporting a bolt 41, which extends longitudinally of the mower and carried by this shaft is a rockable yoke 42 having diverging arms 42ª, at the ends of which are provided bearings 43. The purpose of the rockable or tilting action of yoke 42, Fig. 5, is to allow the drive wheels 45 to always rest on the ground regardless of the position of the cutter bar ahead. On rough ground, if the assembly was rigid, one wheel or the other, would be lifted up off the ground if the mechanism passed over ground of different contour than occupied by the cutter bar. In the bearings 43 is journalled a shaft 44, which carries at its ends the rubber tired ground wheels 45. A pair of forwardly converging braces 46 extend from the bearings 43 and at their junction are pivoted as by a pivot 46ª to the plate 34. On the shaft 36 is fixed a sprocket 47, which is connected by a chain 48 with a sprocket 49 on the shaft 44.

By means of this arrangement when the clutch 21 is closed the shaft 44 will be caused to rotate and drive the ground wheels and it is to be noted that these ground wheels have a slight lateral rocking movement, due to bearing 41 and yoke 42, to accommodate the cutter of the mower to inequalities in the ground.

At each side of the deck there is provided a downwardly extending side plate 50, which has toward its front end a boss 51 constituting a bearing for a reel shaft 52, which has a projecting end and on that projecting end is fixed a sprocket 53, which is connected by a chain 54 with the sprocket 33. By means of the rocking support of the sprocket 33, the reel shaft may be caused to revolve or remain idle at the desire of the operator. This reel shaft carries the usual set of spiral cutter blades 55. Extending between the front part of the side plates is a fixed cutter bar 56 having a cutting edge 57. Extending downwardly from the bar 56 and behind its cutting edge 57 are pairs of bearings 58 and between the bearings of each pair is a roller 59, which is rotatably supported by a shaft 60.

Suitable means 61 is provided on the rear of the deck for attachment of a handle but the handle and its connections with the clutch and rocker are not deemed necessary here to be shown as the handle connection and the handle itself forms no specific part of the present invention.

It is to be noted that the ground wheels 45 are connected to the shaft 44 by clutch mechanisms 61' in such manner that the ground wheels are free to revolve on the shaft 44 when the mower is drawn backwardly but, when the mower is to be moved forward, the clutch mechanism secures the ground wheels to their shaft in such manner that the revolution of the shaft drives the ground wheel forwardly.

It is also to be noted that the rollers 59 are supported behind the cutting edge of the cutter bar 56, Fig. 4.

Upon referring to the drawings it will be seen that all wheels and rollers of this mower are located behind the cutting bar and also inside of the cutting area in such a manner that the grass is cut first, before the rollers and wheels reach that area.

What is claimed is:

1. In a self-contained lawn mower, a deck, frame sides depending from the sides of said deck, a motor mounted on the rear portion of said deck, a jack shaft supported from and extending transversely above the forward portion, a drive shaft, driving means connecting the motor and drive shaft, a laterally tilting frame mounted beneath said deck and supported thereby, said frame including laterally spaced bearings, a ground wheel shaft journalled in said bearings, ground wheels having ratchet connection with said shaft, a sprocket revolubly mounted on said jack shaft, clutch means releasably connecting the sprocket to said drive shaft, operating means actuating said clutch means, and reduction gearing connecting said sprocket to said ground wheel shaft, in combination with a longitudinally rockable frame mounted on said deck at the forward portion thereof, a second jack-shaft journalled in said frame to move towards and from said motor, belt and pulley means connecting the motor and the last mentioned rock shaft, means to rock said frame and thereby tighten and loosen the belt, a blade provided reel revolubly mounted between said sides, and gearing connecting the last mentioned jack shaft with said reel.

2. In a self-contained lawn mower, a deck, frame sides depending from the sides of said deck, a motor mounted on the rear portion of said deck, a jack shaft supported from and extending transversely above the forward portion, a drive shaft, driving means connecting the motor and drive shaft, a laterally tilting frame mounted beneath said deck and supported thereby, said frame including laterally spaced bearings, a ground wheel shaft journalled in said bearings, ground wheels having ratchet connection with said shaft, a sprocket revolubly mounted on said jack shaft, clutch means releasably connecting the sprocket to said drive shaft, operating means actuating said clutch means, and reduction gearing connecting said sprocket to said ground wheel shaft, said reduction gearing including a second jack shaft carried by and extending transversely of the deck, a sprocket on said second jack shaft, a chain connecting the sprockets on said jack shafts, a second sprocket fixed on the second jack shaft, a sprocket fixed on said ground wheel shaft, and a chain connecting the last two sprockets, in combination with a longitudinally rockable frame mounted on said deck at the forward portion thereof, a jack shaft journalled in said frame to move towards and from said motor, belt and pulley means connecting the motor and the last mentioned rock shaft, means to rock said frame and thereby tighten and loosen the belt, a blade provided reel revolubly mounted between said sides, and gearing connecting the last mentioned jack shaft with said reel.

References Cited in the file of this patent

UNITED STATES PATENTS

| | | |
|---|---|---|
| 664,599 | Weir | Dec. 25, 1900 |
| 1,012,521 | Coldwell | Dec. 19, 1911 |
| 1,947,117 | Stegeman et al. | Feb. 13, 1934 |
| 2,204,254 | Moyer | June 11, 1940 |
| 2,220,705 | Burckes | Nov. 5, 1940 |
| 2,453,819 | Smith | Nov. 16, 1948 |
| 2,504,259 | Ford | Apr. 18, 1950 |
| 2,696,705 | Greber | Dec. 14, 1954 |